United States Patent
Kikuchi et al.

(10) Patent No.: US 9,514,860 B2
(45) Date of Patent: Dec. 6, 2016

(54) POWER TRANSMISSION CABLE USING NON-HALOGEN FLAME-RETARDANT RESIN COMPOSITION

(71) Applicant: Hitachi Metals, Ltd., Tokyo (JP)

(72) Inventors: Ryutaro Kikuchi, Mito (JP); Takayuki Tanaka, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/813,917

(22) Filed: Jul. 30, 2015

(65) Prior Publication Data
US 2016/0148724 A1    May 26, 2016

(30) Foreign Application Priority Data
Nov. 20, 2014  (JP) ................. 2014-235120

(51) Int. Cl.
| | | |
|---|---|---|
| H01B 7/00 | (2006.01) |
| H01B 7/295 | (2006.01) |
| H01B 3/44 | (2006.01) |
| H01B 9/02 | (2006.01) |
| H01B 3/46 | (2006.01) |
| C08K 9/02 | (2006.01) |
| C08K 3/36 | (2006.01) |

(52) U.S. Cl.
CPC ............. *H01B 7/295* (2013.01); *C08K 3/36* (2013.01); *C08K 9/02* (2013.01); *H01B 3/443* (2013.01); *H01B 3/46* (2013.01); *H01B 9/027* (2013.01)

(58) Field of Classification Search
USPC .............. 174/102 R, 102 SC, 110 R, 120 R, 120 AR, 174/120 SC
See application file for complete search history.

(56) References Cited

U.S. PATENT DOCUMENTS

| | | | |
|---|---|---|---|
| 6,506,492 B1 * | 1/2003 | Foulger | H01B 1/22 174/110 PM |
| 2006/0102376 A1 * | 5/2006 | Kuchita | H01B 3/446 174/102 SC |
| 2006/0137894 A1 * | 6/2006 | Cusson | H01B 7/20 174/105 R |
| 2010/0078194 A1 * | 4/2010 | Bhatt | B82Y 30/00 174/110 SR |

(Continued)

FOREIGN PATENT DOCUMENTS

JP    2001-006446 A    1/2001

*Primary Examiner* — William H Mayo, III
(74) *Attorney, Agent, or Firm* — McGinn IP Law Group, PLLC

(57) ABSTRACT

A power transmission cable includes a conductor, an inner semiconductive layer around the conductor, an electrically insulating layer around the inner semiconductive layer, an outer semiconductive layer around the electrically insulating layer, a shielding layer around the outer semiconductive layer, a binder tape layer around the shielding layer, and a sheath layer around the binder tape layer. The power transmission cable having an outer diameter of not smaller than 30 mm and not greater than 60 mm. The sheath layer having a thickness of not smaller than 2 mm and not greater than 4 mm, and is made of a non-halogen flame-retardant resin composition including a total of not lower than 100 parts and not higher than 180 parts of metal hydrate and silica per 100 parts of a base polymer, by mass, including an ethylene-vinyl acetate copolymer with a vinyl acetate content of not lower than 50 wt. %.

2 Claims, 1 Drawing Sheet

(56) References Cited

U.S. PATENT DOCUMENTS

| | | | |
|---|---|---|---|
| 2010/0132973 A1* | 6/2010 | Fitz | H01B 9/02 |
| | | | 174/102 R |
| 2010/0209705 A1* | 8/2010 | Lin | C08F 255/02 |
| | | | 428/391 |
| 2013/0092416 A1* | 4/2013 | Saito | H01B 3/28 |
| | | | 174/120 SC |
| 2013/0168126 A1* | 7/2013 | Kuchta | H01B 7/361 |
| | | | 174/102 SC |
| 2014/0151084 A1* | 6/2014 | Spalding | H01B 3/30 |
| | | | 174/120 SR |

* cited by examiner

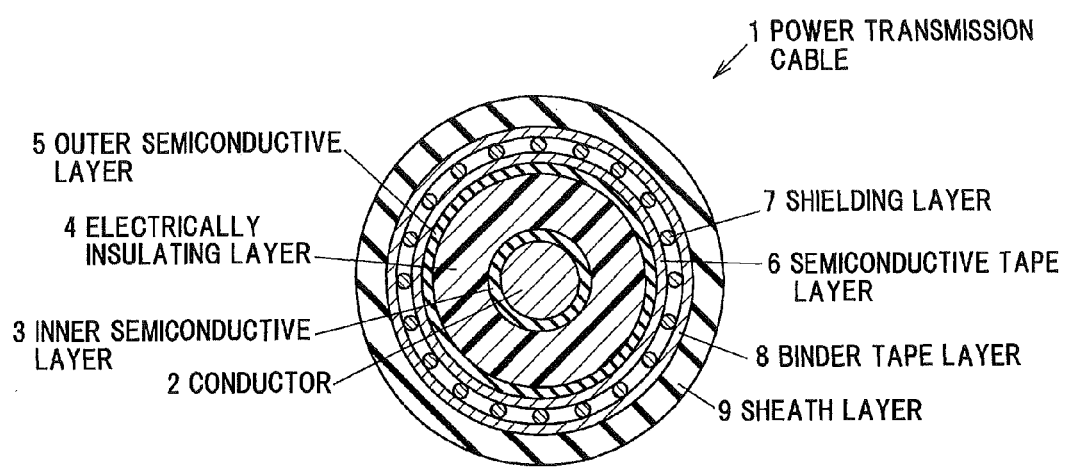

POWER TRANSMISSION CABLE USING NON-HALOGEN FLAME-RETARDANT RESIN COMPOSITION

The present application is based on Japanese patent application No. 2014-235120 filed on Nov. 20, 2014, the entire contents of which are incorporated herein by reference.

BACKGROUND OF THE INVENTION

1. Field of the Invention

This invention relates to a power transmission cable using a non-halogen flame-retardant resin composition having a high flame retardancy and suppressing a smoke evolution amount during combustion.

2. Description of the Related Art

As a method to impart flame retardancy without using a halogen-including compound, there is a method by using a metal hydrate, which does not produce a corrosive gas during combustion, such as aluminum hydroxide, magnesium hydroxide, etc. Refer to e.g. JP-A-2001-6446.

In general, power cables using a non-halogen resin composition having a high flame retardancy are focused on electrical properties, and use an electrically insulating layer configured to use no metal hydrate or be lightly filled with a metal hydrate, and adopt such a configuration that a sheath material located at an outer layer develops flame retardancy. As a flame retarding method for the sheath layer, there has been used a method by adding a large amount of metal hydrate to a resin.

Refer to e.g. JP-A-2001-6446.

SUMMARY OF THE INVENTION

However, this method has the problem that since burnt residue produced during combustion is brittle, flame spreads inside an electric wire, leading to inner combustible material expansion, gasification, and incomplete combustion, worsening flame retardancy and smoke evolution.

As a method to solve the foregoing problem, in order to suppress gasification and sublimation, there is also a method by using a high melting point aromatic tape or a noncombustible tape or high flame-retardant tape, but this method has the problem that the cable is thick in outer diameter and high in cost. This method therefore still has room for examination.

In view of the foregoing, it is an object of the present invention to provide a power transmission cable using a non-halogen flame-retardant resin composition, which achieves a high flame retardancy and a low smoke evolution amount.

In order to achieve the above object, the present invention provides a power transmission cable using a non-halogen flame-retardant resin composition described below.

According to an embodiment of the invention, a power transmission cable comprises:

a conductor;

an inner semiconductive layer formed around a circumference of the conductor;

an electrically insulating layer formed around an outer circumference of the inner semiconductive layer;

an outer semiconductive layer formed around an outer circumference of the electrically insulating layer;

a shielding layer comprising a wire wound around an outer circumference of the outer semiconductive layer;

a binder tape layer comprising a binder tape wound around an outer circumference of the shielding layer; and a sheath layer formed around an outer circumference of the binder tape layer, wherein the power transmission cable comprises an outer diameter of not smaller than 30 mm and not greater than 60 mm, the sheath layer comprises a thickness of not smaller than 2 mm and not greater than 4 mm, and the sheath layer is made of a non-halogen flame-retardant resin composition including a total of not lower than 100 parts and not higher than 180 parts of metal hydrate and silica per 100 parts of a base polymer, by mass, including an ethylene-vinyl acetate copolymer with a vinyl acetate content of not lower than 50 wt %.

In the embodiment, the following modifications and changes may be made.

The amount of the metal hydrate to be added is not larger than 130 parts by mass per 100 parts by mass of the base polymer.

POINTS OF THE INVENTION

The present invention can provide the power transmission cable using the non-halogen flame-retardant resin composition which solves the above problem and which achieves a high flame retardancy and a low smoke evolution amount.

BRIEF DESCRIPTION OF THE DRAWINGS

The preferred embodiments according to the invention will be explained below referring to the drawings, wherein:

FIG. 1 is a cross-sectional view showing a power transmission cable in an embodiment of the present invention.

DETAILED DESCRIPTION OF THE PREFERRED EMBODIMENTS

Power Transmission Cable

A power transmission cable in an embodiment of the present invention is comprised of a conductor; an inner semiconductive layer formed around a circumference of the conductor; an electrically insulating layer formed around an outer circumference of the inner semiconductive layer; an outer semiconductive layer formed around an outer circumference of the electrically insulating layer; a shielding layer comprising a wire wound around an outer circumference of the outer semiconductive layer; a binder tape layer comprising a binder tape wound around an outer circumference of the shielding layer; and a sheath layer formed around an outer circumference of the binder tape layer, wherein the power transmission cable comprises an outer diameter of not smaller than 30 mm and not greater than 60 mm, the sheath layer comprises a thickness of not smaller than 2 mm and not greater than 4 mm, and the sheath layer is made of a non-halogen flame-retardant resin composition including a total of not lower than 100 parts and not higher than 180 parts of metal hydrate and silica per 100 parts of a base polymer, by mass, including an ethylene-vinyl acetate copolymer with a vinyl acetate content of not lower than 50 wt %.

FIG. 1 is a front view showing a power transmission cable in the embodiment of the present invention.

The power transmission cable in the embodiment of the present invention includes the inner semiconductive layer formed around the circumference of the conductor; the electrically insulating layer formed around the outer circumference of the inner semiconductive layer; the outer semiconductive layer formed around the outer circumference of the electrically insulating layer; the shielding layer comprising a wire wound around the outer circumference of the outer semiconductive layer; the binder tape layer comprising a binder tape wound around the outer circumference of the shielding layer; and the sheath layer formed around the outer circumference of the binder tape layer.

More specifically, it is possible to use the power transmission cable 1 including the conductor 2 made of a stranded wire, the inner semiconductive layer 3 formed around the circumference of the conductor 2, the electrically insulating layer 4 formed around the outer circumference of the inner semiconductive layer 3, the outer semiconductive layer 5 formed around the outer circumference of the electrically insulating layer 4, the semiconductive tape layer 6 formed by winding the semiconductive tape 60 around the outer circumference of the outer semiconductive layer 5, the shielding layer 7 formed by winding the wire 70 around the outer circumference of the semiconductive tape layer 6, the binder tape layer 8 formed by winding the binder tape 80 around the outer circumference of the shielding layer 7, and the sheath layer 9 formed around the outer circumference of the binder tape layer 8. The non-halogen flame retardant resin composition used in the sheath layer 9 will be described later.

The conductor 2 is formed by twisting a plurality of strands together. For the strands, it is possible to use, e.g., a rod of a tin-plated annealed copper wire or the like. The conductor 2 transmits electricity at high voltages of e.g. 7000 V or above.

The inner semiconductive layer 3 and the outer semiconductive layer 5 are provided so as to mitigate the concentration of the electric field, and are formed, e.g., by dispersing an electrically conductive powder such as carbon or the like into a rubber, such as ethylene-propylene rubber, butyl rubber, or the like, to impart electrical conductivity to that rubber, and extrusion molding that electrically conductive rubber.

The insulating layer 4 is formed, e.g., by extrusion molding a material such as ethylene propylene rubber, polyvinyl chloride, crosslinked polyethylene, silicone rubber, a fluorine-based material, or the like.

The semiconductive tape layer 6 is formed by, in the cable longitudinal direction, helically overlap wrapping the semiconductive tape 60 around the outer circumference of the outer semiconductive layer 5 in such a manner that the tape 60 overlaps itself by e.g. ¼ to ½ its width. The semiconductive tape 60 may be formed, e.g. by impregnating a woven base fabric with warp and weft therein or a nonwoven fabric made of nylon or rayon, PET or the like with a rubber such as ethylene-propylene rubber, butyl rubber or the like with an electrically conductive powder such as carbon or the like dispersed therein. The semiconductive tape 60 to be used may be e.g. not smaller than 0.1 mm and not greater than 0.4 mm in thickness, and not smaller than 30 mm and not greater than 70 mm in width.

The shielding layer 7 is formed by, in the cable axial direction, helically winding the wire 70 around the outer circumference of the semiconductive tape layer 6. The wire 70 may be formed of e.g. an electrically conductive material such as tin-plated soft copper or the like. The wire 70 may use a wire rod having a diameter of e.g. not smaller than 0.4 mm and not greater than 0.6 mm. The shielding layer 7 is grounded when used.

The binder tape layer 8 is formed by, in the cable axial direction, helically overlap wrapping the binder tape 80 around the outer circumference of the shielding layer 7. The binder tape 80 may use a tape made of a plastic or rayon having a thickness of e.g. not smaller than 0.03 mm and not greater than 0.2 mm, and a width of e.g. not smaller than 50 mm and not greater than 90 mm The sheath layer 9 uses a non-halogen flame-retardant resin composition containing a total of not lower than 100 parts by mass and not higher than 180 parts by mass of metal hydrate and silica per 100 parts by mass of a base polymer including an ethylene-vinyl acetate copolymer (EVA) with a vinyl acetate content of not lower than 50 wt %.

For the ethylene-vinyl acetate copolymer used in the power transmission cable in the embodiment of the present invention, the content of its vinyl acetate to be used is not lower than 50 wt %. This is because if the vinyl acetate content is lower than 50 wt %, the resulting burnt residue is brittle, and has no good flame retardancy and no low smoke evolution.

If the total amount of the metal hydrate and the silica used in the power transmission cable in the embodiment of the present invention does not range from not lower than 100 parts by mass to not higher than 180 parts by mass of metal hydrate and silica per 100 parts by mass of the base polymer, neither the high flame retardancy nor the low smoke evolution is achieved. This is because if the total amount of the metal hydrate and the silica is lower than 100 parts by mass, the flame retardancy is insufficient, while if the total amount of the metal hydrate and the silica exceeds 180 parts by mass, the smoke evolution worsens. From the point of view of the compatibility of the high flame retardancy and the low smoke evolution, the total amount of the metal hydrate and the silica is more preferably not lower than 130 parts by mass and not higher than 150 parts by mass.

The metal hydrate may use aluminum hydroxide, magnesium hydroxide, or the like, and preferably its surface is coupled with a fatty acid or a silane compound. The amount of the metal hydrate to be added is preferably not greater than 130 parts by mass. From the point of view of the flame retardancy, the amount of the metal hydrate to be added is preferably not smaller than 90 parts by mass and not greater than 130 parts by mass, and from the point of view of the smoke evolution, it is more preferable that the above two metal hydrates be used together, and that the amount of the metal hydrates to be added be not smaller than 100 parts by mass and not greater than 120 parts by mass.

The combination ratio (weight ratio) of these two metal hydrates is preferably magnesium hydroxide:aluminum hydroxide=40:60 to 60:40. This is because it has been found that a stepwise dehydration approach is more effective in cable temperature rise suppression and burnt residue solidification after onset of non-halogen flame-retardant resin composition combustion. The term "stepwise dehydration" herein refers to dehydration onset temperatures of aluminum hydroxide and magnesium hydroxide, around 210 degrees C. and around 280 degrees C., respectively.

The silica to be used in the power transmission cable in the embodiment of the present invention may be non-crystalline or crystalline. The silica is used for burnt residue solidification during combustion. If no silica is added, burnt residue is not solidified, and low smoke evolution is not achieved.

The effect of the power transmission cable in the embodiment of the present invention develops in power transmission cables having a cable outer diameter of not smaller than 30 mm and not greater than 60 mm, and a thickness of their sheath layer of not smaller than 2 mm and not greater than 4 mm. If the cable outer diameter is smaller than 30 mm, the flame retardancy is insufficient. When the cable outer diameter exceeds 60 mm, the high flame retardancy and the low smoke evolution are compatible, even though the total amount of the metal hydrate and the silica to be added is not higher than 180 parts by mass.

If the thickness of the sheath layer is smaller than 2 mm, neither the high flame retardancy nor the low smoke evolution develops. When the thickness of the sheath layer exceeds 4 mm, the high flame retardancy and the low smoke evolution are compatible, even though the total amount of the metal hydrate and the silica to be added is not higher than 180 parts by mass.

The power transmission cable in the embodiment of the present invention includes the inner semiconductive layer formed around the circumference of the conductor; the electrically insulating layer formed around the outer circumference of the inner semiconductive layer; the outer semiconductive layer formed around the outer circumference of the electrically insulating layer; the shielding layer formed by winding the wire around the outer circumference of the outer semiconductive layer; the binder tape layer formed by winding the binder tape around the outer circumference of the shielding layer; and the sheath layer formed around the outer circumference of the binder tape layer. This is because the burnt residue of the sheath layer produced during combustion is moderately tough, and has a moderate porosity. The tough burnt residue is considered to act as a thermally insulating layer to mitigate stress resulting from expansion of the electrical insulator, etc. due to combustion heat and prevent ingress of flame into the power transmission cable, while the porosity is considered to act to emit the gas component from inside the power transmission cable due to the combustion heat to the sheath layer side and suppress incomplete combustion.

Further, in the non-halogen flame-retardant resin composition used in the power transmission cable in the embodiment of the present invention, a polyolefin resin modified with maleic acid or the like or a silane coupling agent, a crosslinking reaction promoter, an antioxidizing agent, other lubricants, coloring agents, etc., if desired, can be compounded without impairing the effect of the present invention.

Producing Method

Next is described one example of a method of producing the power transmission cable 1.

Around the circumference of the conductor 2, the inner semiconductive layer 3, the electrically insulating layer 4, and the outer semiconductive layer 5 are extrusion molded in this order. Then, the semiconductive tape layer 6 is formed by, in the cable axial direction, helically wrapping the semiconductive tape 60 around the outer circumference of the outer semiconductive layer 5, the shielding layer 7 is formed by, in the cable axial direction, helically winding the wire 70 around the outer circumference of the semiconductive tape layer 6, and the binder tape layer 8 is formed by, in the cable axial direction, helically overlap wrapping the binder tape 80 around the outer circumference of the shielding layer 7. Then, the sheath layer 9 is extrusion molded around the outer circumference of the binder tape layer 8. This is followed by vulcanization in conditions of not shorter than 5 min to not longer than 60 min in a continuous vulcanizing machine under an atmosphere at not shorter than 150 degrees C. to not higher than 180 degrees C. In this manner, the power transmission cable 1 is produced.

The power transmission cable in the embodiment of the present invention can be used in, e.g., high-voltage cables specially designed for rail vehicles, etc.

Advantageous Effects of the Embodiment of the Present Invention

The present invention can provide the power transmission cable using the non-halogen flame-retardant resin composition having achieved a high flame retardancy and a low smoke evolution amount, by setting the outer diameter of the power transmission cable at not smaller than 30 mm and not greater than 60 mm, setting the thickness of the sheath layer at not smaller than 2 mm and not greater than 4 mm, and making the sheath layer of the non-halogen flame-retardant resin composition containing a total of not lower than 100 parts and not higher than 180 parts of the metal hydrate and the silica per 100 parts of the base polymer, by mass, including the ethylene-vinyl acetate copolymer with a vinyl acetate content of not lower than 50 wt %, in the power transmission cable including the inner semiconductive layer formed around the circumference of the conductor, the electrically insulating layer formed around the outer circumference of the inner semiconductive layer, the outer semiconductive layer formed around the outer circumference of the electrically insulating layer, the shielding layer formed by winding the wire around the outer circumference of the outer semiconductive layer, the binder tape layer formed by winding the binder tape around the outer circumference of the shielding layer, and the sheath layer formed around the outer circumference of the binder tape layer.

EXAMPLES

The present invention is described more specifically by giving Examples. These Examples are intended to present one aspect of the present invention, not limit the present invention, but any alterations may be made within the scope of the invention.

Examples

A three-layer extrusion coated wire composed of an inner semiconductive layer, an electrically insulating layer, and an outer semiconductive layer was produced, by a co-extrusion to continuous vulcanization process, around a conductor made of a tin-plated annealed copper stranded wire. This was followed by wrapping a semiconductive tape therearound, transversely winding a wire, and applying a binder tape (e.g., a PET tape and an anti-compression rayon tape) to produce three types of cables having their respective different outer diameters. The outer diameters of these three types of cables were adjusted to be 32 mm, 37.7 mm, and 50.7 mm A plurality of types of the sheath layers were applied by an extruder to the resulting three types of cable structures, in such a manner that their respective thicknesses were not smaller than 2 mm and not greater than 4 mm, followed by batch vulcanization resulting in power transmission cables. The sheath layers used combination compositions listed in Table 1.

Comparative Examples

In Comparative examples, sheath layers used combination compositions listed in Table 2, and power transmission cables were produced in the same conditions as in the Examples, except that their respective cable outer diameters were smaller than 30 mm or greater than 60 mm, and except that their respective thicknesses were smaller than 2 mm or greater than 4 mm The resulting power transmission cables were tested for flammability and smoke evolution, based on the following method.

Flammability: Vertical tray flammability testing (VTFT) was performed, based on EN50266-2-4. The flammability was determined as "Accepted" for a posttest char length of smaller than 250 cm, or as "Rejected" for a posttest char length exceeding 250 cm.

Smoke evolution: 3 m cube smoke evolution testing was performed, based on EN50268-2. The smoke evolution was determined as "Accepted" for a transmittance of not lower than 60%, or as "Rejected" for a transmittance of lower than 60%.

TABLE 1

| | | Examples | | | | | | | |
|---|---|---|---|---|---|---|---|---|---|
| | Combination | 1 | 2 | 3 | 4 | 5 | 6 | 7 | 8 |
| Polymer | EVA (Levapren 600HV (VA60%) @LANXESS, Deutschland) | 85 | 85 | 85 | 85 | 85 | 85 | 85 | 85 |
| | EVA (V9000HV (VA41%) @LANXESS, Deutschland) | | | | | | | | |
| | Maleic acid modified polyolefin (TAFMER MH5040 @Mitsui Chemicals) | 15 | 15 | 15 | 15 | 15 | 15 | 15 | 15 |
| Lubricant | Lithium hydroxystearate (@Nitto Chemical Industry Co., Ltd.) | 2 | 2 | 2 | 2 | 2 | 2 | 2 | 2 |
| Flame retardant | Silane-coated magnesium hydroxide (H10A @Albemarle Corporation) | 100 | 50 | 130 | 70 | 100 | 100 | 100 | 50 |
| | Fatty acid-coated aluminium hydroxide (0L107C @Albemarle Corporation) | | 50 | | | | | | 50 |
| | Amorphous silica (Mega sil535 @Sibelco) | 50 | 50 | 50 | 30 | 50 | 50 | 50 | 50 |
| | Crystalline silica (SILVERBOND 925 @Sibelco) | | | | | | | | |
| Crosslinker | Trigonox 117 @NOF CORPORATION | 2.5 | 2.5 | 2.5 | 2.5 | 2.5 | 2.5 | 2.5 | 2.5 |
| Crosslinking promoter | TAIC (@Hangzhou Keli Chemical Co., Ltd.) | 1 | 1 | 1 | 1 | 1 | 1 | 1 | 1 |
| UV absorber | LA32 (@ADEKA Corporation) | 0.1 | 0.1 | 0.1 | 0.1 | 0.1 | 0.1 | 0.1 | 0.1 |
| Antioxidizing agent | A018 (@ADEKA Corporation) | 1 | 1 | 1 | 1 | 1 | 1 | 1 | 1 |
| | LA52 (@ADEKA Corporation) | 0.1 | 0.1 | 0.1 | 0.1 | 0.1 | 0.1 | 0.1 | 0.1 |
| Total | | 256.7 | 256.7 | 286.7 | 206.7 | 256.7 | 256.7 | 256.7 | 256.7 |
| Cable outer diameter 30 mm-60 mm | | 43.0 | 43.0 | 43.0 | 43.0 | 41.8 | 45.8 | 36.0 | 57.0 |
| Sheath thickness 2 mm-4 mm | | 2.6 | 2.6 | 2.6 | 2.6 | 2.0 | 4.0 | 2.7 | 3.1 |
| Total amount of metal hydrate and silica | | 150.0 | 150.0 | 180.0 | 100.0 | 150.0 | 150.0 | 150.0 | 150.0 |
| Metal hydrate | | 100.0 | 100.0 | 130.0 | 70.0 | 100.0 | 100.0 | 100.0 | 100.0 |
| Vertical tray flammability testing (VTFT) <250 | | Accepted | Accepted | Accepted | Accepted | Accepted | Accepted | Accepted | Accepted |
| 3 m cube smoke evolution testing Transmittance ≥60% | | Accepted | Accepted | Accepted | Accepted | Accepted | Accepted | Accepted | Accepted |

TABLE 2

| | | Comparative examples | | | | |
|---|---|---|---|---|---|---|
| | Combination | 1 | 2 | 3 | 4 | 5 |
| Polymer | EVA (Levapren 600HV (VA60%) @LANXESS, Deutschland) | 85 | 85 | 85 | 85 | |
| | EVA (V9000HV (VA41%) @LANXESS, Deutschland) | | | | | 85 |
| | Maleic acid modified polyolefin (TAFMER MH5040 @Mitsui Chemicals) | 15 | 15 | 15 | 15 | 15 |
| Lubricant | Lithium hydroxystearate (@Nitto Chemical Industry Co., Ltd.) | 2 | 2 | 2 | 2 | 2 |
| Flame retardant | Silane-coated magnesium hydroxide (H10A @Albemarle Corporation) | 100 | 50 | 180 | 50 | 100 |
| | Fatty acid-coated aluminium hydroxide (0L107C @Albemarle Corporation) | | 50 | | | |
| | Amorphous silica (Mega sil535 @Sibelco) | 50 | 50 | 10 | 30 | 50 |
| | Crystalline silica (SILVERBOND 925 @Sibelco) | | | | | |
| Crosslinker | Trigonox 117 @NOF CORPORATION | 2.5 | 2.5 | 2.5 | 2.5 | 2.5 |
| Crosslinking promoter | TAIC (@Hangzhou Keli Chemical Co., Ltd.) | 1 | 1 | 1 | 1 | 1 |
| UV absorber | LA32 (@ADEKA Corporation) | 0.1 | 0.1 | 0.1 | 0.1 | 0.1 |
| Antioxidizing agent | A018 (@ADEKA Corporation) | 1 | 1 | 1 | 1 | 1 |
| | LA52 (@ADEKA Corporation) | 0.1 | 0.1 | 0.1 | 0.1 | 0.1 |
| Total | | 256.7 | 256.7 | 296.7 | 186.7 | 256.7 |
| Cable outer diameter 30 mm-60 mm | | 38.8 | 25.0 | 43.0 | 41.8 | 43.0 |
| Sheath thickness 2 mm-4 mm | | 0.5 | 0.5 | 2.6 | 2.0 | 2.6 |
| Total amount of metal hydrate and silica | | 150.0 | 150.0 | 190.0 | 80.0 | 150.0 |

TABLE 2-continued

| | Comparative examples | | | | |
|---|---|---|---|---|---|
| Combination | 1 | 2 | 3 | 4 | 5 |
| Metal hydrate | 100.0 | 100.0 | 180.0 | 50.0 | 100.0 |
| Vertical tray flammability testing (VTFT) <250 | Rejected | Rejected | Accepted | Rejected | Rejected |
| 3 m cube smoke evolution testing Transmittance ≥60% | Rejected | Rejected | Rejected | Accepted | Accepted |

From the results shown in Table 1, the power transmission cables produced in Examples 1 to 8 were good in both the flame retardancy and the smoke evolution.

In contrast, Comparative examples 1 to 7 shown in Table 2 had problems in both or one of the flame retardancy and the smoke evolution.

In Comparative example 1, since its sheath layer thickness was as thin as 0.5 mm, its power transmission cable was rejected for both the flame retardancy testing and the smoke evolution testing.

In Comparative example 2, since its sheath layer thickness was as thin as 0.5 mm and its cable outer diameter was as thin as 25.0 mm, its power transmission cable was rejected for both the flame retardancy testing and the smoke evolution testing.

In Comparative example 3, since the total amount of the metal hydrate and the silica added therein was as too large as 190.0 parts by mass, its power transmission cable was rejected for the smoke evolution testing.

In Comparative example 4, since the total amount of the metal hydrate and the silica added therein was as too small as 80.0 parts by mass, its power transmission cable was rejected for the flame retardancy testing.

In Comparative example 5, since the VA amount was as small as 41%, its power transmission cable was rejected for the flame retardancy testing.

Subsequently, the power transmission cables after the smoke evolution testing in Example 1 and Comparative example 3 were dismantled and observed. As a result, in Comparative example 3, it was verified that its electrical insulator had a damaged portion on the order of 1800 mm² due to combustion, whereas in Example 1, no damaged portion was verified. It was verified that Example 1 produced the harder burnt residue of the sheath layer, while Comparative example 3 had the higher porosity of the burnt residue of the sheath layer. It was deduced that since Example 1 moderately formed voids produced by dehydration of the metal hydrate, and diluted the combustible gas of the sheath layer itself with the silica, Example 1 allowed the formation of the harder burnt residue, and thereby suppressed the worsening of the smoke evolution due to the damage to the electrical insulator. On the other hand, it was deduced that since Comparative example 3 added the high amount of the metal hydrate, Comparative example 3 increased the porosity of the burnt residue due to the endothermic effect, but thereby promoted the embrittlement of the burnt residue itself and the emission of the incomplete combustion gas of the electrical insulator, etc.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A power transmission cable, comprising:
   a conductor;
   an inner semiconductive layer formed around a circumference of the conductor;
   an electrically insulating layer formed around an outer circumference of the inner semiconductive layer;
   an outer semiconductive layer formed around an outer circumference of the electrically insulating layer;
   a shielding layer comprising a wire wound around an outer circumference of the outer semiconductive layer;
   a binder tape layer comprising a binder tape wound around an outer circumference of the shielding layer; and
   a sheath layer formed around an outer circumference of the binder tape layer,
   wherein the power transmission cable comprises an outer diameter of not smaller than 30 mm and not greater than 60 mm, the sheath layer comprises a thickness of not smaller than 2 mm and not greater than 4 mm, and the sheath layer is made of a non-halogen flame-retardant resin composition including a total of not lower than 100 parts and not higher than 180 parts of metal hydrate and silica per 100 parts of a base polymer, by mass, including an ethylene-vinyl acetate copolymer with a vinyl acetate content of not lower than 50 wt %.

2. The power transmission cable according to claim 1, wherein
   the amount of the metal hydrate to be added is not larger than 130 parts per 100 parts of the base polymer, by mass.

* * * * *